(12) United States Patent
Roberts et al.

(10) Patent No.: US 10,488,005 B2
(45) Date of Patent: Nov. 26, 2019

(54) FLAMELESS ELECTRONIC CANDLE

(71) Applicant: MerchSource, LLC, Irvine, CA (US)

(72) Inventors: Michael Roberts, Burien, WA (US); Y-Co Thy Nguyen-Viveros, Irvine, CA (US)

(73) Assignee: MerchSource, LLC, Irvine, CA (US)

( * ) Notice: Subject to any disclaimer, the term of this patent is extended or adjusted under 35 U.S.C. 154(b) by 0 days.

(21) Appl. No.: 16/285,536

(22) Filed: Feb. 26, 2019

(65) Prior Publication Data

US 2019/0186705 A1 Jun. 20, 2019

Related U.S. Application Data

(62) Division of application No. 15/938,935, filed on Mar. 28, 2018.

(60) Provisional application No. 62/477,668, filed on Mar. 28, 2017.

(51) Int. Cl.
| | |
|---|---|
| *F21S 10/04* | (2006.01) |
| *F21S 9/02* | (2006.01) |
| *H05B 33/08* | (2006.01) |
| *F21V 8/00* | (2006.01) |
| *F21S 6/00* | (2006.01) |
| *H05B 37/02* | (2006.01) |

(52) U.S. Cl.
CPC ............ *F21S 10/04* (2013.01); *F21S 6/001* (2013.01); *F21S 9/02* (2013.01); *G02B 6/0006* (2013.01); *H05B 33/086* (2013.01); *H05B 33/0845* (2013.01); *H05B 33/0857* (2013.01); *H05B 37/029* (2013.01)

(58) Field of Classification Search
CPC ... F21S 10/04; F21S 6/001; F21S 9/02; G02B 6/006; H05B 33/0845; H05B 33/0857
See application file for complete search history.

(56) References Cited

U.S. PATENT DOCUMENTS

| | | | | |
|---|---|---|---|---|
| 8,695,247 | B1 * | 4/2014 | Yang | G09F 13/32 362/101 |
| 9,664,349 | B1 * | 5/2017 | Hurduc | F21S 10/046 |
| 9,719,643 | B1 * | 8/2017 | Cheng | F21S 10/043 |
| 9,719,673 | B2 * | 8/2017 | Geisler | H05K 7/1485 |
| 9,958,123 | B2 * | 5/2018 | Cheng | G02B 6/0006 |
| 2006/0034100 | A1 * | 2/2006 | Schnuckle | B44C 5/06 362/161 |
| 2018/0132326 | A1 * | 5/2018 | Li | H05B 33/0854 |

* cited by examiner

*Primary Examiner* — Anabel Ton
(74) *Attorney, Agent, or Firm* — Avyno Law P.C.

(57) ABSTRACT

An imitation candle is provided that simulates an open flame by providing a flickering light effect reflected on a flame element. The flickering light effect may be produced using a light transmitting device, such as a fiber optic cable, that allows light to travel from a light source located near the base of the candle to the top of the candle to reflect off the flame element. The imitation candle may further include an additional light source located in the base of the candle to illuminate the body of the candle. Such additional light source may be one or more light sources of different color, which may allow the body of the candle to change color. Optionally, the color changing body may be implemented in combination with a light source located at the top of the candle that produces a flickering effect.

9 Claims, 8 Drawing Sheets

FLAMELESS ELECTRONIC CANDLE

CROSS-REFERENCE TO RELATED APPLICATIONS

This application is a divisional and claims priority to U.S. patent application Ser. No. 15/938,935 titled FLAMEMESS ELECTRONIC CANDLE, which claims priority to U.S. Provisional application 62/477,668, titled CANDLE HAVING A LIGHT TRANSMISSION DEVICE, filed on Mar. 28, 2017, which is incorporated by reference herein in its entirety.

FIELD OF THE INVENTION

The present invention relates to candles, and, in particular, flameless electronic candles.

BACKGROUND OF THE INVENTION

Candles produce both necessary and pleasurable effects. Flameless candles offer a safe means in contrast to traditional candles because they are often illuminated by a small bulb or light emitting diode (LED) rather than an open flame and pose less threat or a fire hazard, since the candle can be left unattended. The risk of open flames has caused many state and local governments to outlaw traditional candles inside public spaces, and many families have removed them from their homes. In addition to safety factors, the ease and convenience of operation and the reduced cost of flameless candles compared to traditional candles makes them an attractive alternative. Moreover, flameless candles are more environmentally friendly than traditional open flame candles, which release harmful toxins and oils into the air. Flameless candles also last for years, meaning that the user does not have to replace them constantly following use, which creates less waste.

Various types of flarrieless candles exist, including tea candles, votive candles, pillar candles or other types of candles. Flameless candles can simulate the flickering effect of a real candle without the danger of an open flame. Some such techniques, for example, are described in U.S. Pat. Nos. 6,616,308, 9,447,937, and 9,068,706. Flameless candles may include various parts, including a lamp, battery contacts, and a switch. Some may even be operated by remote control devices.

One drawback of flameless candles is that the lamp, bulb or LED is not that attractive as an open flame because they do not provide a realistic flame appearance. Thus, a need still exists for flameless candles that have more realistic appearances.

SUMMARY OF THE INVENTION

The present invention is an imitation candle that simulates an open flame by providing a flickering light effect reflected on a flame element. The flickering light effect may be produced using a light transmitting device, such as a fiber optic cable, that allows light to travel from a light source located near the base of the candle to the top of the candle to reflect off the flame element. The imitation candle may further include an additional light source located in the base of the candle to illuminate the body of the candle. Such additional light source may be one or more light sources of different color, which may allow the body of the candle to change color. Optionally, the color changing body may be implemented in combination with light source located at the top of the candle that produces a flickering effect.

In one implementation, the imitation candle of the present invention includes, for example, an opaque housing made of wax or other substance to imitate a candle body, a top surface, an energy or power source operably connected to circuitry containing one or a plurality of LEDs as a light source, a light transmission device (e.g., fiber optic cable, wiring, or piping, including but not limited to an acrylic light pipe) within the housing operably positioned adjacent to at least one LED light source and terminating at the other end near the top surface of the imitation candle to reflect light on a faux flame element. The faux flame element may be either flat or of some three-dimensional shape, e.g. bulbous, and may be either stationary or movable, e.g. by hanging freely, being fixedly attached to a pendulum or by forced mechanical movement. In one example, the LED light source or light sources can be made to flicker to create a more realistic candle effect.

Optionally, a concave reflector may be positioned below the top surface to assist with reflecting the light from the light transmission device on the faux flame element. Optionally, the light transmission device may terminate within the lower end of a bulbous flame element. In another example, the bulbous flame element may also include a reflective surface in the base of the flame element to scatter the light from the light transmission device within the bulbous element.

In another implementation, light sources may be provided in the base of the candle to illuminate the candle body from within the housing of the candle. The light sources may be several LEDs of differing colors, such as red, green, and blue LEDs, which through standard circuitry, may be illuminated individually, together, and/or in various combinations, each at the same or different intensities to create color changing effects, thereby producing a color changing light source. The color changing light source is capable of being controlled by a processor, programed to control the light source in different modes of the operation, to produce a candle having a color changing body. Such color changing candle light source for changing the color of the candle body may use used in conjunction with a light source that creates a flickering flame effect on the top of the candle to give the appearance of an open flame. Such flickering flame effect may be created using a light transmitting device or a flickering light source which may be used alone or in conjunction with a faux flame element, where the light transmitting device and/or flickering light source projects light directly on the faux flame element.

Other devices, apparatus, systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE FIGURES

Figure 1:
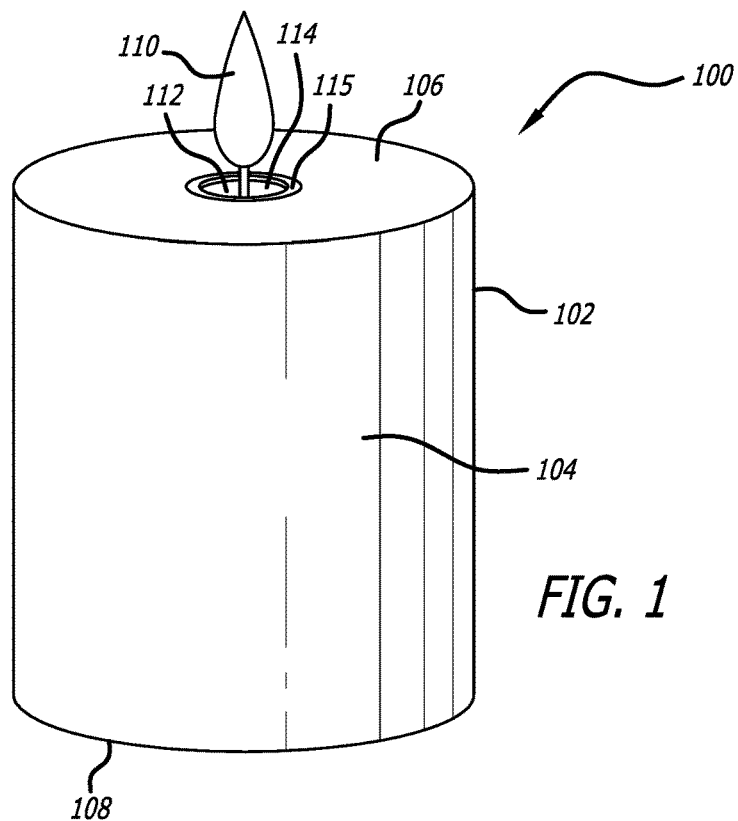
FIG. 1 illustrates a side perspective view of one example of an implementation of an imitation candle of the present invention.
Figure 2:
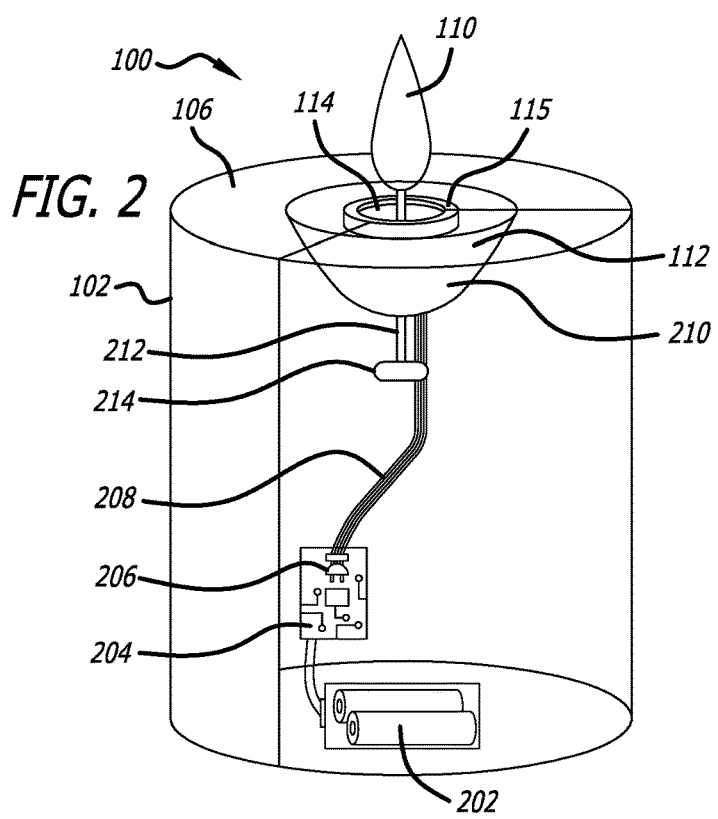
FIG. 2 is a partial cutaway view of the imitation candle of FIG. 1.
Figure 3:
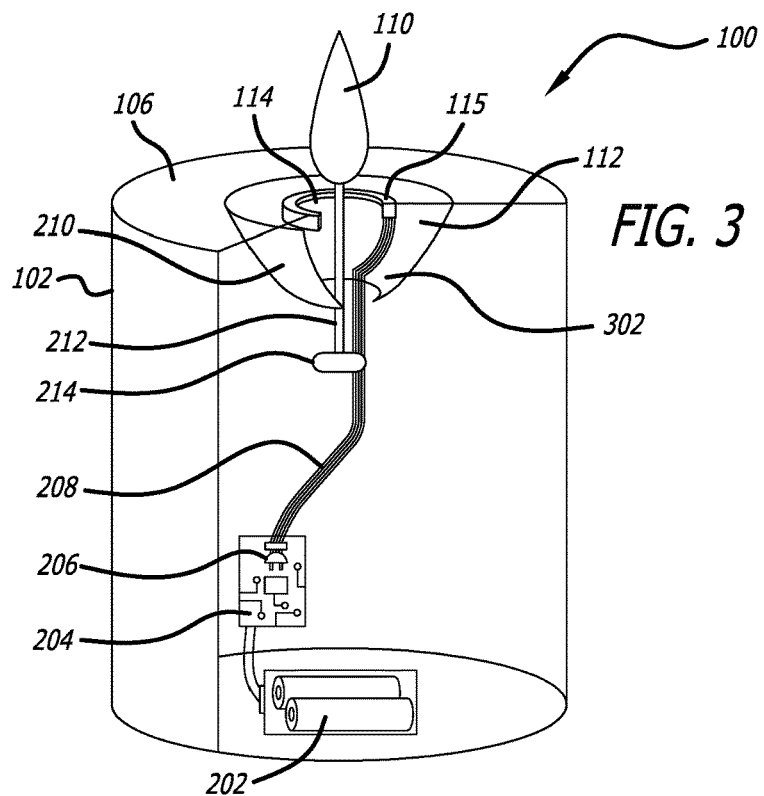
FIG. 3 is another partial cutaway view of the imitation candle of FIG. 1.

FIGS. 1-3 illustrate one example of an implementation of an imitation candle of the present invention. In particular, FIG. 1 illustrates a side perspective view of one example of an imitation candle in accordance with the present invention. As illustrated in FIG. 1, the imitation candle 100, in its simplest form, comprises a housing 102 that resembles a candle, where the housing 102 comprises a body 104 with a horizontal lower surface 108 on which it rests and a top surface 106. The housing 102 further comprises an interior cavity or cavities to allow electronic components to be disposed within the imitation candle 100. The housing 102 can be made of wax or any material suitable for providing a wax-like or candle-like appearance. The housing 102 may further be opaque such that no light can shine through the body 104 or transparent such that light may shine through the body 104. Similarly, the top surface 106 of the housing 102 may be opaque or translucent.

In some examples, the top surface 106 and body 104 may be comprised of different material to achieve different levels of translucency. For example, the body 104 may be translucent while the top surface 106 is opaque or the top surface 106 may be translucent while the body 104 is opaque. In another example, the body 104 itself may be comprised of different material to achieve different levels of translucency throughout the housing 102, to create, for example, a gradient, layered, or other non-uniform translucent effect. The housing 102 can be standalone or positioned within a container or on a base (not shown), which may be made of glass or other translucent material, such as plastic, and/or on any opaque base, such as a wooden base.

Figure 5:
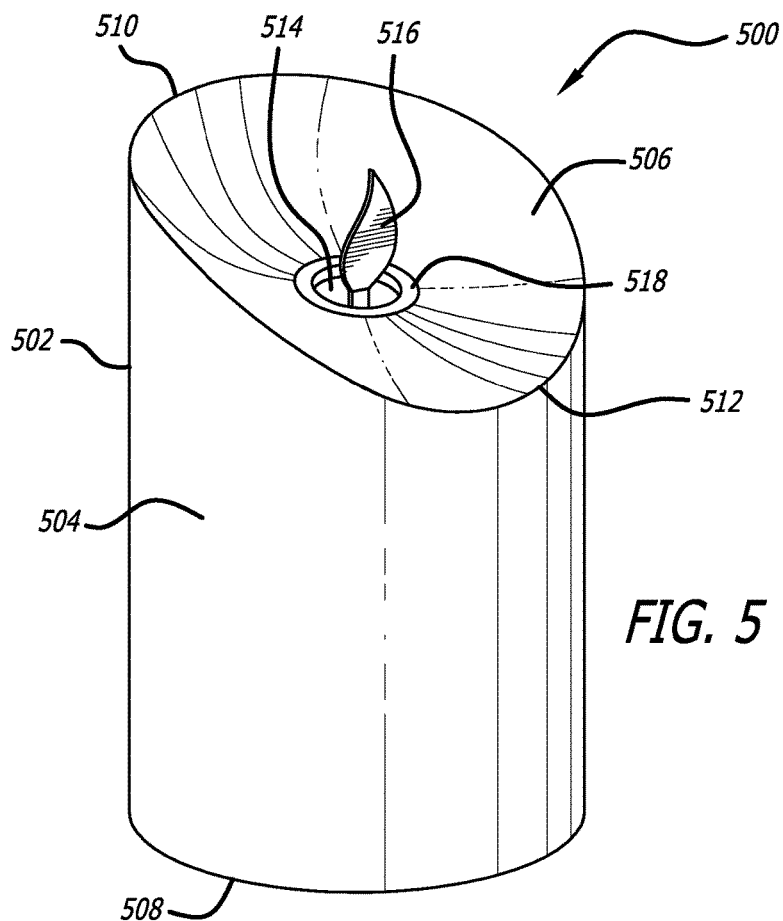
FIG. 5 illustrates a side perspective view of another example of an implementation of an imitation candle of the present invention.

While imitation candle 100 is illustrated as being cylindrical, other horizontal cross sectional shapes are possible, such as rectangular, square or triangular, as well as irregular shapes. Top surface 106, while shown to be substantially flat, may include an indented or depressed central region, which is preferably shaped to resemble a top portion of a true flame candle that has been reduced by melting to feed a flame supported from a central wick. An example of another candle shape that can be used for the imitation candle 100 is shown in FIG. 5.

In the illustrated example, the top surface 106 of the imitation candle 100 is provided with a through hole 114 near the center of the top surface 106. Positioned just under the top surface 106 is a light transmitting device housing 112 having a circular rim 115 disposed circumferentially around the perimeter of the through hole 114, securing the light transmitting device housing 112 to the top surface 106 of the imitation candle 100.

A flame element 110 may be positioned to extend upward and out of the through hole 114. At least a portion of the flame element 110 that extends upward from the through hole 114 may be shaped to imitate a flame of a burning candle. As will be discussed in further detail below, light emitted from a light source 206 (FIG. 2), which may be disposed in the hollow region or cavity of the housing 102, may be reflected onto at least a portion of the flame element 110 that protrudes from the through hole 114.

Figure 10:
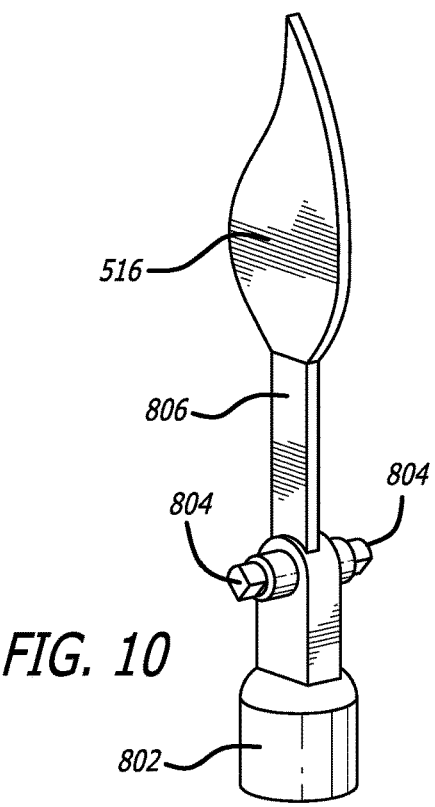
FIG. 10 is a perspective view of the flame element of the imitation candle of FIG. 5.

While FIGS. 1-3 illustrate the flame element 110 as a three-dimensional element (e.g. bulbous), the flame element may be of any other shape. For example, the flame element may be flat or substantially two-dimensional as illustrated in FIG. 10. Further, flame element 110 may be fixed, sway freely under the action of natural winds or manual movement, or may be forced to swing by a swing mechanism that uses any mechanical or electrical means that causes the flame element 100 to move relative to the housing 102. Whether the flame element 110 swings freely or by a swing mechanism, it is intended that the swaying of the flame element, when viewed from a distance, sways or moves like that of a true candle flame, as if it is a perfectly realistic flame, and thus can be scarcely distinguished from a true candle flame.

Further, the flame element 110 may be rigid. The flame element 110 may be formed from one or more materials, such as glass, plastic, metal, or foil. Such material(s) may be at least partially reflective. The flame element 110 may be opaque, semi-opaque, clear, frosted, or translucent. The flame element 110 may also have a mesh or other textured surface.

As discussed above, the light emitted from light source 206 (FIG. 2), may be reflected onto at least a portion of the flame element 110. It is understood that the light may be reflected onto the exterior walls of the flame element 110. Alternatively, when the flame element 110 is bulbous in shape, the light or light producing element may be positioned within the flame element 110 and reflected off the interior walls of the bulbous flame element 110.

FIGS. 2 and 3 illustrate partial cutaway side perspective views of the imitation candle of FIG. 1. FIG. 3 differs from FIG. 2 in that a portion of the light transmitting device housing 112 is also cut away showing the components positioned within the light transmitting device housing 112.

As shown in FIGS. 2 and 3, the housing 102 comprises a power source 202, a circuit board 204 connected to light source 206, a light transmitting device 208, and a reflector 210. The reflector 210 forms part of the light transmitting device housing 112. The power source 202 may be provided by batteries (such as two AA batteries, as illustrated) or by a connection to an external AC power source, or both. As illustrated, the power source 202 provides power to circuit board 204. Circuit board 204 may be a standard circuit board that simply turns the light source 206 on or off, may provide a flickering effect to light source 206, may provide a color changing effect to light source 206, or any combination thereof. Additionally, the circuit board 204 may be a programmable controller that is programmed to operate the imitation candle 100 in different modes.

Figure 12:
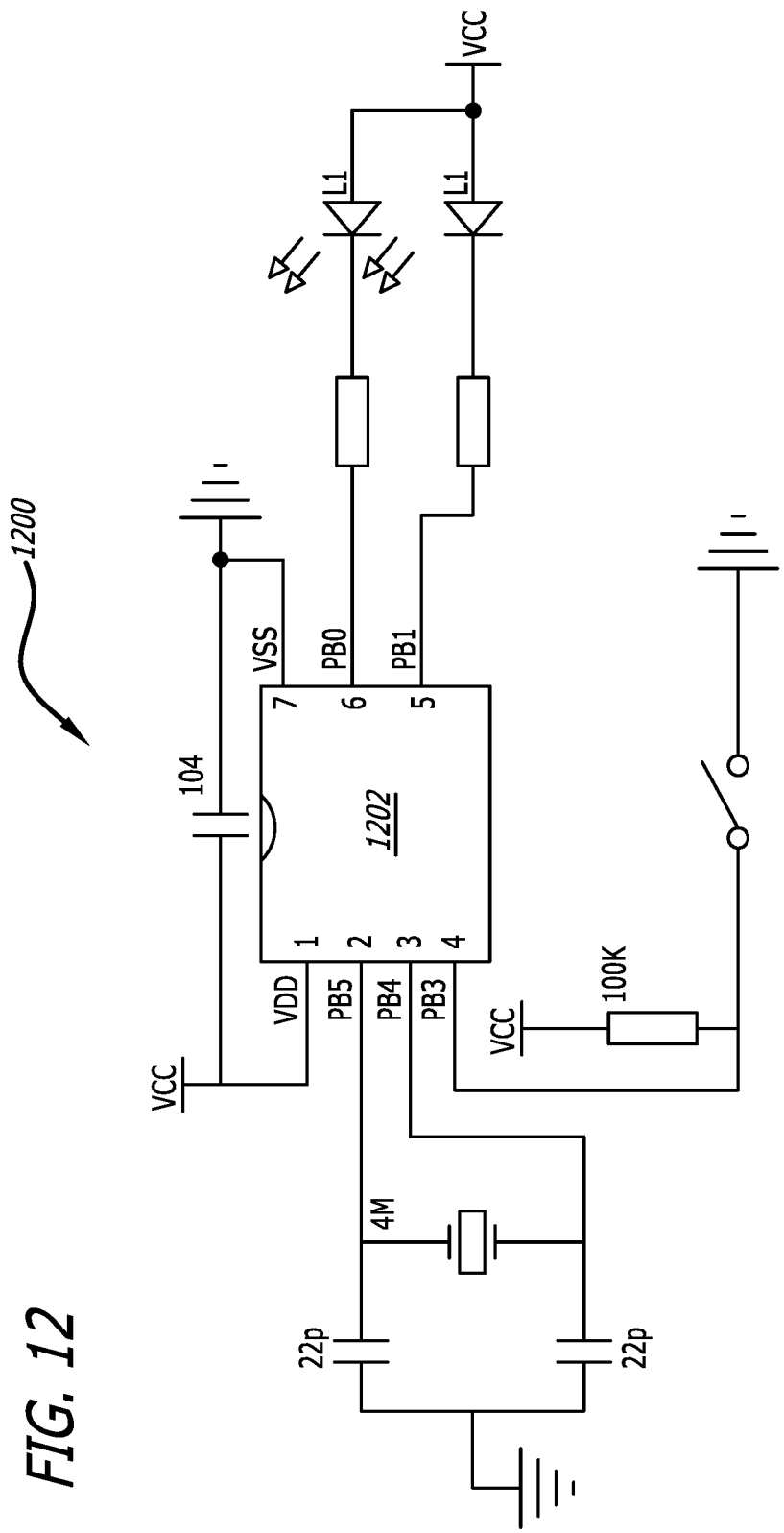
FIG. 12 is a schematic diagram showing an example circuit used to simulate a flickering flame element in the electronic candle of the present invention.

Light source 206 may be a single light emitting diode (LED) or a plurality of LEDs. As set forth above, light source 206 may be made to flicker, by rapidly turning the light source on and off, or by alternatively lighting multiple LEDs to create a flickering effect. When light source 206 includes multiple light sources 206, the light sources 206 may be controlled together or independently controlled, by any circuitry known in the art to create a flickering effect. An example of a circuit that may be used in connection with the imitation candle 100 to create a flickering effect is provided in FIG. 12. While the circuit in FIG. 12 shows the use of the two light sources, it is recognized that a flickering effect can also be created by a single light source rapidly switched on and off, or by two or more lights sources that are alternately lit.

Additionally, light source 206 may provide color changing light, where the color changing light is controlled by any circuitry known in the art to create a color changing effect. An example of a circuit that may be used to create a color changing effect in connection with the imitation candle 100 is provided in FIG. 13. In other examples of the present invention, light source 206 may be connected to any circuitry known in the art that provides either or both a flickering and color changing effect. Further, the color changing effect may optionally be made to also create a flickering effect.

In the illustrated example in FIGS. 1-4, light source 206 may be connected to a light transmitting device 208. Although FIGS. 2 and 3 show the light transmitting device 208 as a fiber optic cable or wiring, those skilled in the art will recognize that the light transmitting device 208 can be any device capable of transmitting light illuminated from a light source 206 to another location remote from the light source 206. Such light transmitting device 208 may include, but not be limited to, a fiber optic cable, fiber optic wiring, a light pipe, such as an acrylic pipe, plastic pipe, other elongated member made of materials capable of transmitting light.

Light transmitting device 208 is positioned near light source 206 (e.g., above or adjacent to the light source 208) to transmit the light from light source 206 through the light transmitting device 208 to the light transmitting device housing 112, where the light 206 can be reflected on the flame element 110 of the imitation candle 100. FIGS. 2 and 3 also show the light transmitting device 208 positioned entirely within the housing 102 and extending between the light source 206 to the top of the housing 102, where the light transmitting device 208 wraps around the underside of the circular rim 115 of the light transmitting device housing 112, which encircles the flame element 110, as illustrated in FIG. 3.

While FIG. 3 shows light transmitting device 208 encircling flame element 110, those skilled in the art will recognize that light transmitting device 208 may terminate in a number of different ways. For example, light transmitting device 208 may run inside flame element 110 and illuminate flame element 110 from within. In this example, light transmitting device 208 may terminate within the lower end of flame element 110, and the flame element 110 may include a reflective surface in its interior base surface to scatter the light from the light transmitting device 208 within the flame element 110.

In the example where the light transmitting device 208 encircles the flame element 110 as shown in FIG. 3, light transmitting device 208 may entirely or partially circumscribe the through hole 114 on the top surface 106 of the imitation candle 100 by being disposed on the underside of the light transmitting device housing 112. By being disposed on the underside of the light transmitting device housing 112, light transmitting device 208 may not be directly visible from outside imitation candle 100.

To assist in reflecting the light from the light transmitting device 208 onto the flame element 110, reflector 201, as shown in FIGS. 2 and 3, may be included as part of the light transmitting device housing 112, which is engaged within the housing 102 below the top surface 106. Reflector 210 may be concave, such that the top of reflector 210, which is near the top surface 106 of the housing 102, encircles the through hole 114 and the circular rim 115 such that reflector 210 is wider than the through hole 114 and circular rim 115. FIGS. 2 and 3 show reflector 210 being at its widest near the top surface 106 of candle 100, reflector 210 becomes narrower towards the bottom as it curves inward, thus forming an inverted dome shape, thereby reflecting the light from the light transmitting device 208 upward through the through hole 114.

As shown in the partial cutaway side view of FIG. 3, the inner surface 302 of reflector 210 is reflective. The underside of the top surface 106 of the imitation candle 100 and the exterior surface of the flame element 110 may also be reflective (regardless of whether the flame element 110 is flat (i.e., two-dimensional) or three-dimensional). In operation, when electricity is provided by power source 202 to light source 206, i.e., the power is turned "on," light from the light source 206 passes through the light transmitting device 208 and illuminates the reflective inner surface 302 of the reflector 210 and the underside of the top surface 106 of the imitation candle 100 above the reflector 210. Light is also reflected onto flame element 110 (which may also be reflective) by the angles provided by the concave curvature of the inner surface 302 of reflector 210 through the through hole 114. In this instance, the flame element 110 may appear to be "lit." The reflector 210 and flame element 110 may be formed from a material such as plastic, glass, metal, mirror, or any other material that has (or upon which can be deposited) a reflective surface.

In the example shown in FIGS. 1-3, the flame element 110 may be attached to the top end of pendulum 212, which may have a counter weight 214 attached to the opposite bottom end of pendulum 212. Pendulum 212 may be pivotally engaged within the housing 102 in the center just below the top surface 106 within the circumference of the reflector 210, allowing the pendulum 212 and flame element 110 to naturally move in response to environmental conditions, such as wind, air flow, or vibration.

As further shown in FIGS. 2 and 3, to accommodate pendulum 212 of the illustrated example and the passing of the light transmitting device 208, the bottom of the reflector 210 may have an opening 304 through which the pendulum 212 and light transmitting device 208 passes.

As stated above, housing 102 may also include a central cavity or cavities to allow the light transmitting device 208 to pass from the light source 206 to the top of the imitation candle 100 and to accommodate such things as the power source 202 and circuitry 204, and to permit engagement of the reflector 210 and pendulum 212 of the illustrated example.

Figure 9:
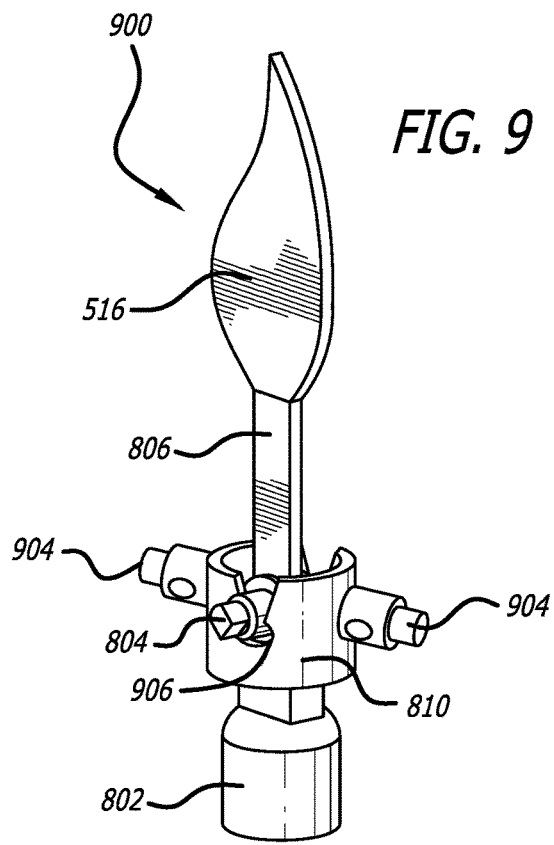
FIG. 9 is a perspective view of the flame element pivotally connected to a pivot support of the imitation candle of FIG. 5.

It should further be noted that other counterweight pendulum structures may be used in connection with the flame element 110 of the imitation candle 100, such as the flame element structure 900 shown on FIG. 9. In addition to being suspended on a pendulum as shown, the flame element 110 may also be stationary or be forced to move by a swinging mechanism through mechanical or electronic means (such as motors or magnetics).

Optionally, an electronic chip that produces sound may be provided in the housing 102 in electrical connection with the power source 202 to provide a desired sound effect when the power is turned on. A speaker may further be provided in the housing 102 to produce the sound effect. Optionally, the imitation candle 100 may also include wired and/or wireless network capabilities, including but not limited to Wi-Fi and Bluetooth connections, to allow the candle 100 to be network enabled or controlled by an electronic device. In addition, the housing may contain a receiver and microprocessor to permit operation by remote control, and/or a timer that switches the imitation candle "on" or "off" at a particular time. The candle may also include hardware and software necessary to allow the candle to be controlled by a remote control using RF signals. In some instances the remote control may comprise a software application installed on an electronic device such as a smartphone, tablet, laptop computer, or other computing device.

Figure 4:
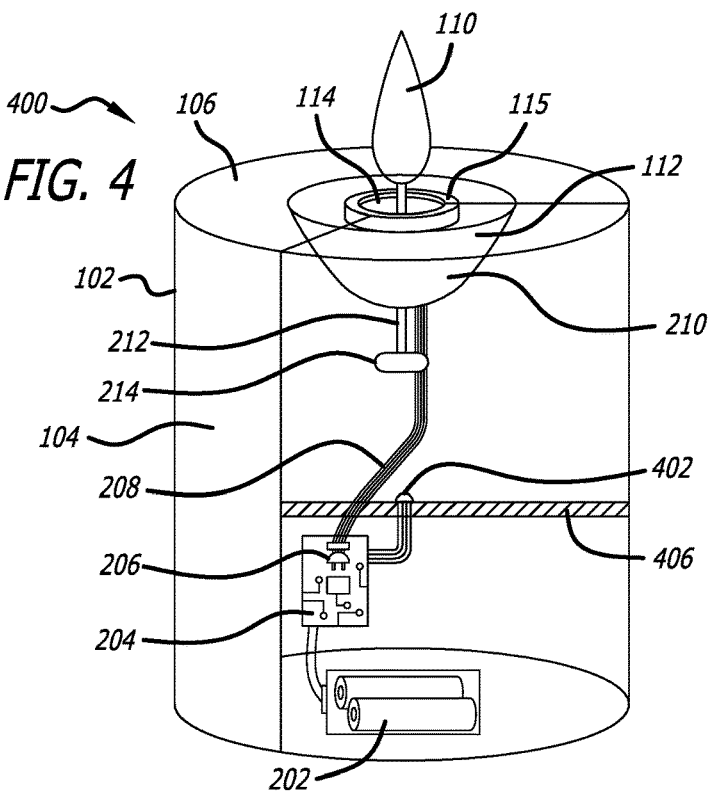
FIG. 4 illustrates a partial cutaway view of another example of an implementation of an imitation candle of the present invention.

FIG. 4 illustrates a partial cutaway view of another example of an implementation of an imitation candle 400 of the present invention. As illustrated, FIG. 4 includes all of the features described in FIGS. 1-3 in addition to light source 402 disposed within the body 104 of the imitation candle 400 that may be supported by platform 406.

In particular, light source 402 is a separate light source from light source 206 as light source 402 is not connected to any light transmitting device 208. Rather than illuminate, shine, or reflect light on flame element 110, the purpose of light source 402 is to illuminate the body 104 of imitation candle 400. Thus, the body 104 of imitation candle 400 may be translucent such that the light emitting from light source 402 is visible through the walls of the body 104 of the imitation candle 400.

The light source 402 may be a single LED or a plurality of LEDs. While FIG. 4 shows light sources 402, 204 connected to the same circuit board 204 and sharing the same power source 202, those having skill in the art will recognize that light sources 402, 204 may be connected to separate circuits having separate power sources, separate circuits sharing the same power source, or the same circuit, but powered separately in parallel from the power source(s).

Similar to light source 206, light source 402 can be controlled together or independently controlled, by any circuitry known in the art. Light source 402 may be a solid state light or may create a flickering effect. An example of a circuit that may be used in connection with the imitation candle 400 to produce a flickering effect is provided in FIG. 12. Such a circuit may be used to create a flickering effect in either or both light sources 206, 402. Additionally, the light source 402 may include different color light sources that allow the color of the candle body 104 to change. Such color changing light may be controlled by any circuitry known in the art to create a color changing effect. An example of a circuit that may be used in connection with the imitation candle 400 to create a color changing effect is provided in FIG. 13. In other examples of the present invention, light source 402 may be connected to any circuitry known in the art that provides both a flickering and/or color changing effect.

In operation, any combination of light effects may be provided to either light source 402 or light source 206. For example, a flickering effect may be provided to light source 206 to provide a flickering effect to flame element 110 through light transmitting device 208, while a color changing effect may be provided to light source 402 to change the colors of the body 404 of imitation candle 400. Similarly, a color changing effect may be provided to light source 206 to provide a color changing effect to flame element 110, while a flickering effect may be provided to light source 402 to provide a flickering effect to the body 404 of imitation candle 400. Alternatively, the color changing effect may also create a flickering effect, such that color selected creates a flickering effect.

While a light source 402 disposed in the body 104 of the candle 400 can be used in combination with a separate light source 208 having a light transmitting device 308, as shown in FIG. 4, it should also be noted that a light source 402 disposed in the body 104 of candle 400 can be used in combination with a separate light source (e.g., 602 of FIG. 6) that directly shines on a flame element (e.g., 110) without the use of a light transmitting device 208, as shown in FIGS. 5-11.

In particular, FIGS. 5-11 illustrate another example of an implementation of an imitation candle of the present invention. FIG. 5 illustrates a side perspective view of the imitation candle 500. As illustrated in FIG. 5, the imitation candle 500, in its simplest form, comprises a housing 502 that resembles a candle, where the housing 502 comprises a body 504 with a horizontal lower surface 508 on which it rests and a top surface 506. The housing 502 further comprises an interior cavity or cavities to allow electronic components to be disposed within the imitation candle 500. The housing 502 can be made of wax or any material suitable for providing a wax-like or candle-like appearance. The housing 502 may further be opaque such that no light can shine through the body 504, transparent such that light may shine through the body 504, or be any gradient composition or any layered (e.g., vertical or horizontal) composition (such as alternating layers of opaque and transparent material). Similarly, the top surface 506 of the housing 502 may be opaque or translucent. In some examples, the top surface 506 and body 504 may be comprised of different material to achieve different levels of translucency. For example, the body 504 may be translucent while the top surface 506 is opaque or the top surface 506 may be translucent while the body 504 is opaque. The housing 502 can be standalone or positioned within a container or on a base (not shown), which may be made of glass or other translucent material, such as plastic, and/or on any opaque base, such as a wooden base.

While imitation candle 500 is illustrated as being cylindrical, other horizontal cross sectional shapes are possible, such as rectangular, square or triangular, as well as irregular shapes. For example, top surface 506 is shown to have a raised back wall 510 while the front wall 512 is shorter in height. This configuration is intended to resemble a top portion of a true flame candle which has been reduced by melting to feed a flame supported from a central wick. An example of another candle shape that can be used for the imitation candle 500 is shown in FIG. 1. It should be noted that the back and front wall 510, 512 may have any varying height around the top perimeter of the top surface 506 of imitation candle 500.

The top surface 506 of the imitation candle 500 may provide a through hole 514 near the center of the top surface 506 and circular ring 518 may be disposed circumferentially around the perimeter of the through hole 514 to circumscribe the through hole 514. A flame element 516 may be arranged in the through hole 514. At least a portion of the flame element 516 extends upward through the through hole 514 and may be shaped as a flame of a burning candle.

As will be discussed in further detail below, light is emitted from light source 602, which is disposed near the top hollow region or cavity of the housing 502 and projected onto at least a portion of the flame element 516 that extend through the through hole 514. While FIGS. 5-10 illustrate the flame element 516 as a flat or substantially two-dimensional element, the flame element 516 may be of any other shape. For example, the flame element 516 may be three-dimensional shape (e.g. bulbous) as illustrated in FIGS. 1-4. While the flame element 516 is shown to be substantially two-dimensional in FIGS. 5-10, it should be noted that the flame element 516 may be flat, concave, convex, or various combinations thereof. The flame element 516 may also have one or more projection surfaces. For example, the flame element 516 may have two projection surfaces—front and back.

The flame element 516 may be rigid and formed from one or more materials, such as glass, plastic, metal, or foil. Such material(s) may be at least partially reflective. The flame element 516 may be opaque, semi-opaque, clear, frosted, or translucent. The flame element 516 may also have a mesh or other textured surface.

Further, flame element 516 may be fixed, sway freely under the action of natural winds, or may be forced to swing by a swing mechanism that uses any mechanical or electrical means that causes the flame element 516 to move relative to housing 502. Whether the flame element 516 swings freely or by a swing mechanism, it is intended that the swaying of the flame element 516, when viewed from a distance, sways or moves like that of a true candle flame, as if it is a perfectly realistic flame, and thus can be scarcely distinguished from a true flame candle.

Figure 6:
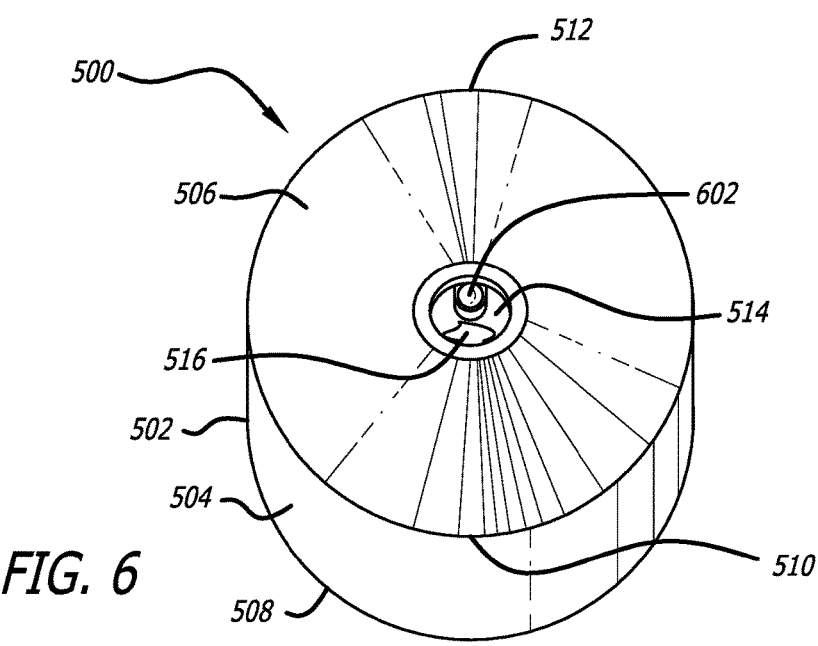
FIG. 6 is a top perspective view of the imitation candle of FIG. 5.
Figure 7:
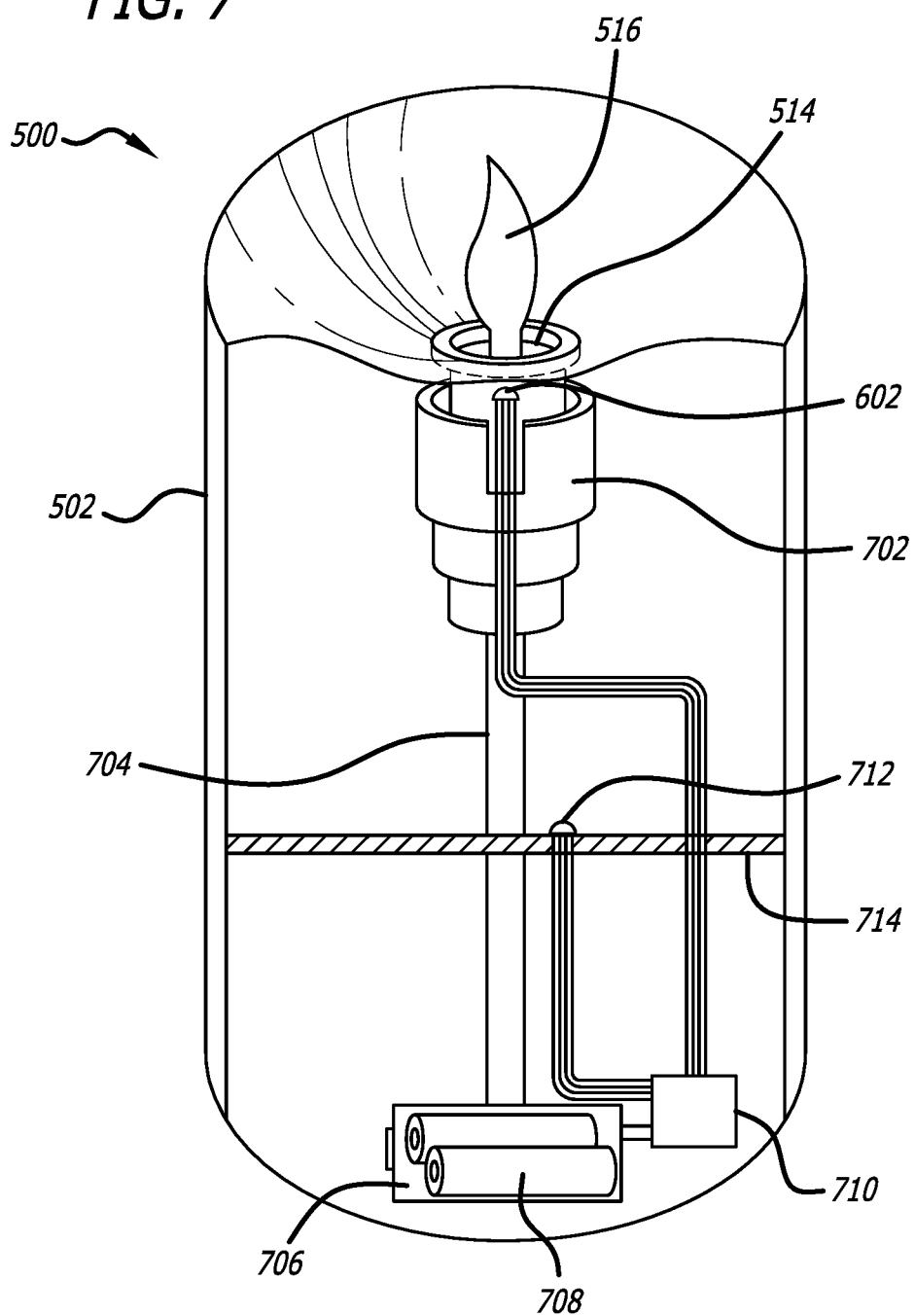
FIG. 7 is a partial cutaway side perspective view of the imitation candle of FIG. 5.
Figure 8:
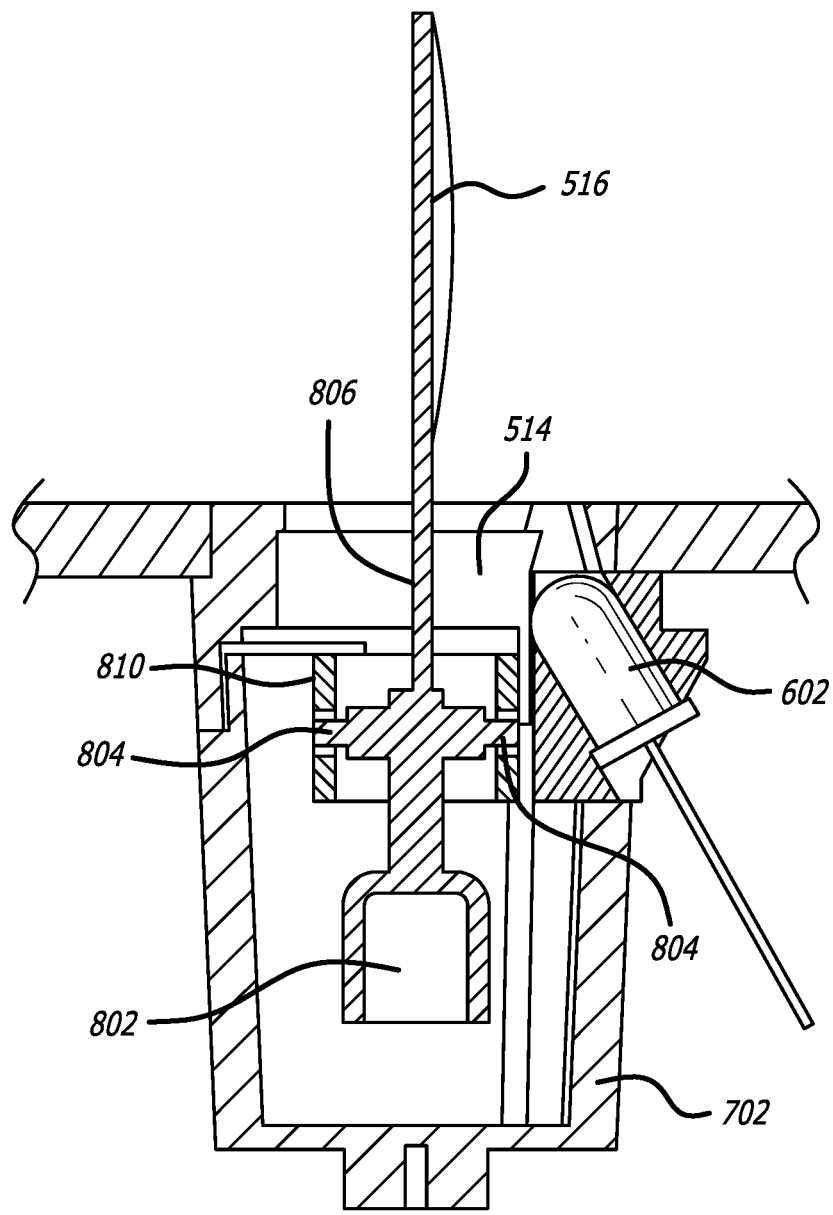
FIG. 8 is a cross section of the light source housing of the imitation candle of FIG. 5.

FIG. 6 illustrates a top perspective view of the imitation candle 500 of FIG. 5. As shown in FIG. 6, a light source 602 is disposed near the top surface 506 of the imitation candle 500 such that it can be viewed from the top of the candle 500. As shown in FIGS. 6-8, light source 602 may be positioned below the top surface 506 and may project light through the through hole 514 onto at least one surface of the flame element 516. Light projected onto at least one surface of the flame element 516 may penetrate through to the other side of the flame element 516. The position of the light source 602 may also be fixed with respect to the position of the flame element 516. While the illustrated example only shows one light source 602 (which may include one or more lighting elements or LEDs), it is recognized that more than one separate light source 602 may be used to shine light on the flame element 516. For example, light sources 602 may be positioned opposing sides of the flame element 506.

FIG. 7 illustrates a partial cutaway side perspective view of the imitation candle of FIG. 5. As shown in FIG. 7, the housing 502 comprises a power source 708, a circuit board 710, which is connected to two separate light sources 602, 712, a light source platform 714 for supporting light source 712, and a light source housing 702 for housing light source 602.

The power source 708 may be housed in a power source housing 706 and may be provided by batteries (such as two AA batteries as illustrated) or by a connection to an external AC power source, or both. As illustrated, power source 708 provides power to circuit board 710. The circuit board 710 may be a standard circuit board that simply turns the light sources 602, 712 on or off, may provide a flickering effect to the light sources 602, 712, may provide a color changing effect to the light sources 602, 712, or any combination thereof. The circuit board 712 may further be a processor or a programmable chip that is capable of being programmed to allow the imitation candle 500 to operate in different modes.

FIG. 7 further illustrates light source 712 disposed within the body of the imitation candle 500 and being supported by platform 714. Platform 714 may be molded to the side walls or may be formed as the top of a compartment that houses the electronics of the candle 500. The platform 714 may further include openings in which the light source housing shaft 704, light source 602, and light source 712 passes through.

The light sources 602, 712 may each comprise a single LEDs or a plurality of LEDs. The light sources 602, 712 may be made to flicker by rapidly turning the LED on and off or by lighting multiple LEDs alternatively to create a flickering effect, using known circuitry in the art. An example of a circuit that may be used in connection with the imitation candle 500 to provide a flickering effect is illustrated in FIG. 12. The light sources 602, 712 can be controlled together or independently controlled.

Additionally, the light sources 602, 712 may provide color changing light, where the color changing effect can also be provided by any circuitry known in the art to create a color changing effect. An example of a color changing circuit board that may be used in connection with the imitation candle 500 to create a color changing effect is provided in FIG. 13. In other examples of the present invention, light sources 602, 712 may be connected to any circuitry known in the art that provides either or both a flickering and color changing effect.

While FIG. 7 shows the light sources 602, 712 connected to the same circuit board 710 and sharing the same power source 708, those having ordinary skill in the art will recognize that the light sources 602, 712 may be connected to separate circuits having separate power sources, separate circuits sharing the same power source, or the same circuit, but powered separately in parallel from the power source(s).

In operation, any combination of light effects may be provided to either light source 602 or light source 712. For example, a flickering effect may be provided to light source 602 to provide a flickering effect to flame element 51, while a color changing effect may be provided to light source 712 to change the colors of the body 504 of imitation candle 500. Similarly, a color changing effect may be provided to light source 602 to provide a color changing effect to the flame element 516 while a flickering effect may be provided to light source 712 to provide a flickering effect to the body 504 of imitation candle 500.

FIG. 7 further illustrates light source housing 702 disposed within the housing 502 of the candle 500. The light source housing 702 holds light source 602 at an angle such that the light from light source 602 is projected upward through the through hole 514 onto at least one surface of the flame element 516. The light source 602 may be attached to the light source housing 702 by glue or any other attachment material known in the art. The light source housing may be supported by a light source housing shaft 704 that is attached or molded to the battery housing 706 or the platform 714. The light source housing 702 may further comprise of a hollow interior cavity to allow the flame element 516 to dangle freely within the housing 702, as illustrated in FIG. 8.

FIG. 8 illustrates a cross section of the light source housing 702 of imitation candle 500. In particular, FIG. 8 illustrates the relative angle of light source 602 to projecting light onto at least one surface of flame element 516 through the through hole 514. While light source 602 is illustrated to be positioned at a particular angle relative to flame element 516, light source 602 may be positioned at any angle to project light on flame element 516.

FIG. 8 illustrates flame element 516 attached to the top end of pendulum 806, which has a counter weight 802 attached to the opposite bottom end of the pendulum 806. The pendulum 806 may also have opposing pivot pendulum rods 804 that protrude perpendicular to the pendulum 806 for pivotally engaging the pendulum 806 with the interior wall of either a pivot support 810 or directly to the light source housing 702. As illustrated, the pivotal engagement of the pivot pendulum rods 804 within the light source housing 702 allows the flame element to swing side to side and naturally move in response to environmental conditions, such as wind, air flow, vibration, or by manual movement.

As shown in FIG. 8, the pendulum 806, pivot pendulum rods 804 and counterweight element 802 may be substantially disposed within the cavity of the light source housing 702 while at least a portion of the flame element 516 may protrude out from the light source housing 702.

It should further be noted that other counterweight pendulum structures may be used in connection with flame element 516 of the imitation candle 500, such as the flame element structure 110 shown on FIGS. 1-4. In addition to being suspended on a pendulum as shown, the flame element 516 may also be stationary or be forced to move by a swinging mechanism through mechanical or electronic means (such as motors or magnetics).

Figure 11:
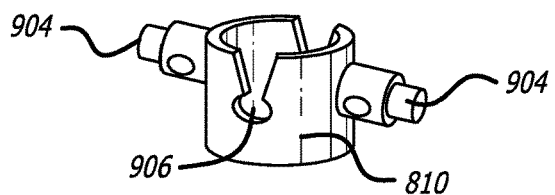
FIG. 11 is a perspective view of the pivot support of the imitation candle of FIG. 5.

As illustrated in FIG. 8, pivot pendulum rods 804 may be pivotally engaged with a pivot support 810 (as illustrated in FIGS. 9 and 11) or, optionally, can be pivotally engaged directly to the interior wall of the light source housing 702. Pivot support 810 may have opposing pivot support rods 904 for pivotally engaging with the interior wall of the light source housing 702. The purpose of pivot support 810 is to allow the flame element to swing in any direction (i.e. side to side, front and back, etc.) in response to environmental conditions, such as wind, air flow, or vibration. Thus, pivot support 810 acts as a gimbal for allowing the rotation of the flame element 516 about a single axis.

FIG. 9 illustrates a perspective view of the flame element structure 900 of the imitation candle 500. As illustrated, flame element 516 is pivotally connected to a pivot support 810. In particular, semi-circular notches 906 are located on opposite sides of pivot support 810 for receiving and pivotally engaging with pivot pendulum rods 804 of pendulum 516. Pivot support 810 may further include opposing pivot support rods 904 for pivotally engaging with the interior wall of the light source housing 702. The pivotal engagement of pivot pendulum rods 804 with pivot support 810 allows the flame element to swing side to side (i.e., yaw rotation) relative to the light source housing 702 while the pivotal engagement of pivot support rods 904 with the interior wall of the light source housing 702 allows the flame element to swing forward and back (i.e., pitch rotation) relative to the light source housing 702. As further illustrated in FIG. 9, when pivotally engaged with pivot support 810, the pivot pendulum rods 804 form a cross pattern with pivot support rods 904. This cross pattern ultimately allows the rotation of the flame element 516 about a single axis (i.e., the point in which the cross pattern intersects).

FIG. 10 illustrates a perspective view of the flame element 516 of the imitation candle of FIG. 5. In particular, FIG. 10 illustrates pendulum 806 having a flame element 516 attached at one end and a counter weight element 802 is attached to an opposing end. FIG. 10 further illustrates two opposing pivot pendulum rods 804 protruding perpendicular from pendulum 806 for engagement with a support member, such as the pivot support 810 or direction with the light source housing 702.

FIG. 11 illustrates a perspective view of the pivot support 810 of the imitation candle of FIG. 5. In particular, FIG. 11 illustrates pivot support 810 having two opposing semi-circular notches 906 for pivotally receiving pivot pendulum rods 804. The pivot support 810 further includes two opposing pivot support rods 904, positioned perpendicular to the semi-circular notches 906 for pivotally engaging with light source housing 702.

FIG. 12 is a schematic diagram showing an example circuit 1200 of the electronic candle of the present invention that produces a flickering effect. It is recognized the other circuits known in the art may be used to produce a flickering light effect and that this circuit 1200 is offered by way of example only. In particular, L1 and L2 signify two light sources, which in this example are semiconductor diodes or light emitting diodes (LED light sources). It should be noted that each of the light sources described herein 206, 402, 602, 712 may comprise one or more semiconductor diodes and that in this example, L1 and L2, together represent a single light source, which may be light source 206, 402, 602, 712. The circuit may be repeated for each light source 206, 402, 602, 712 or additional light sources L1 and L2 may be added to the circuit and control by the chip or processor 1202, independently of L1 and L2 or simultaneously with L1 and L2.

PB0 and PB1 signify I/O pins, which allows electricity to flow to L1 and L2. Both PB0 and PB1 are shared by a voltage source (VCC), which acts as a positive supply voltage. While the circuit shows the use of to two light sources, L1 and L2, in parallel, those skilled in the art will recognize that more than two light sources can be used in the circuit of FIG. 12.

In operation, a flickering effect is created by alternately lighting L1 and L2 using pulse-width modulation. The intensities of each light source may also be adjusted by varying a pulse-code modulated signal or a pulse-width modulated signal provided to a given light source.

It should further be noted that the schematic diagram in FIG. 12 illustrates the controlling of voltage of both L1 and L2 simultaneously rather than independently. In another example of circuitry, one having skill in the art will recognize that L1 and L2 may also be independently controlled. For example, circuitry 1200 may independently control one or more different aspects of the light projected by light sources 206, 402 or 602, 712, each light source of which, for example, may further include one or more LEDs. For example, circuitry 1200 may be capable of separately controlling the intensity or color for each light source 206, 402, 602, 712. Additionally, circuitry 1200 may illuminate each light source 206, 402, 602, 712 with different sequences of intensities. Such sequences may include random sequences, semi-random sequences, or predetermined sequences. A sequence may include a repeating loop (for example, a 5-10 second loop). Such sequences may include frequencies that are out of phase from each other. For example, one predetermined sequence may be applied to the source of light 206, and the same predetermined sequence may be applied to the source of light 402, but out of phase. As another example, a first predetermined sequence may be applied to the source of light 206 and second predetermined sequence may be synchronously applied to the source of light 402. The second predetermined sequence may result from filtering or adjusting the first predetermined sequence. Such filtering may include high-pass and low-pass filtering, and such adjusting may include attenuating the amplitudes of the first predetermined sequence.

Sequences may be dynamically influenced by other factors or inputs, for examples, by timers. In another example, an output signal from a light sensor (not shown) could be received by the circuitry 1200, which may, in turn, adjust the intensity levels in sequences according to the light sensor output signal (for example, boost the intensities under higher light). As another example, an output signal from a sound sensor (not shown) could be received by the circuitry 1200, which may, in turn, adjust the intensity levels in sequences according to the sound sensor output signal (for example, adjust the frequency of the intensity changes in response to the character of received sound).

According to one example, it may be possible to provide a separate controller for each light source 206, 402, 602, 712. Each separate controller may be integrated into an epoxy case that houses an LED. The two separate controllers may be synchronized through a synchronization signal provided to each controller or between the controllers. For example, an additional lead may extend from the controller and to outside of the epoxy case. The additional leads from two LED assemblies may be connected together and a synchronization signal may be communicated between via this connection to enable synchronous operation.

Figure 13:
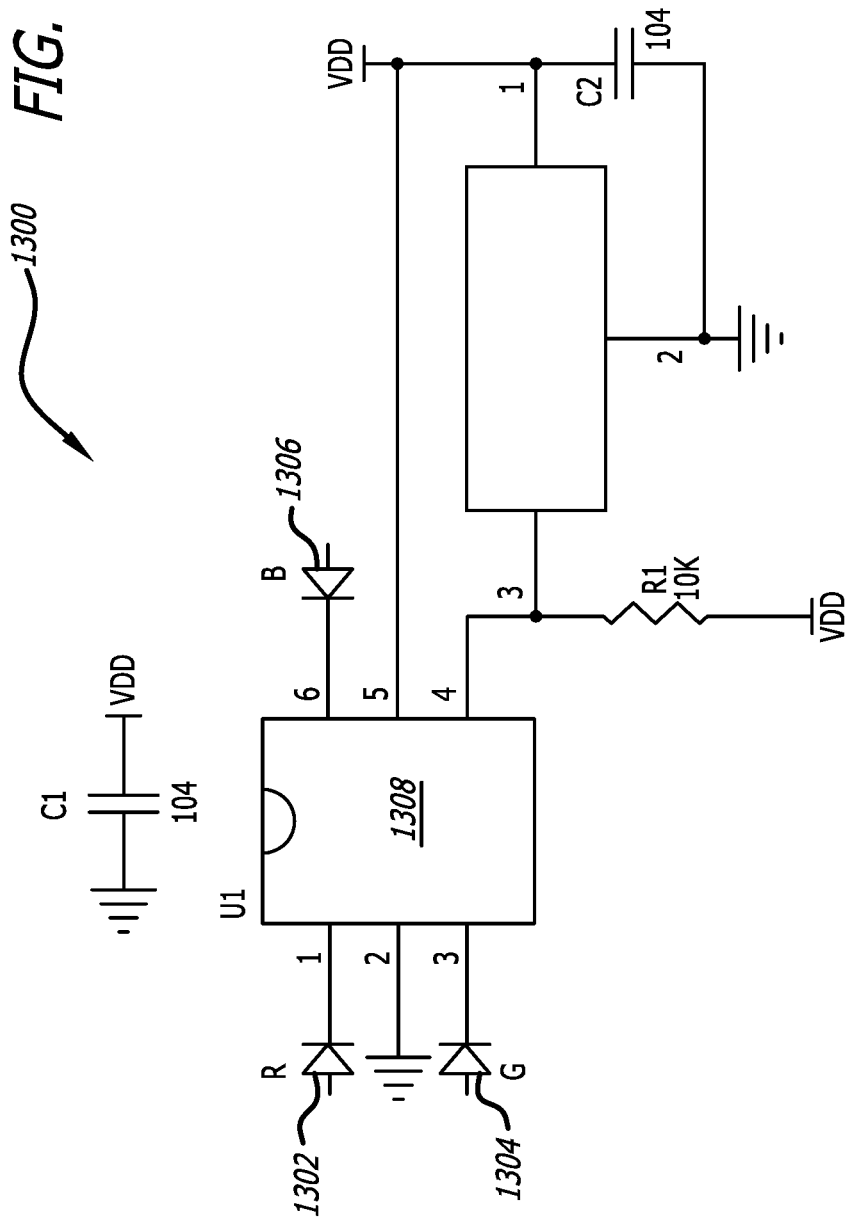
FIG. 13 is a schematic diagram showing an example circuit used to produce a color changing effect in the base of the electronic candle of the present invention.

FIG. 13 is a schematic diagram showing an example of a circuit 1300 of the electronic candle of the present invention that may be used to produce a color changing effect in the base of the candle. In particular, those having skill in the art will recognize that the circuit 1300, in one example, of a circuit that may be utilized to change the colors of light sources 206, 402, 602, 712 in accordance with the present invention by using red, green and blue LEDs, 1302, 1304 and 1306, controlled through a chip, processor or controller 1308, which may be controlled through switches or may be a programmable chip, programmed to operate in different modes, producing a number of different color effects by illuminating the red, green and blue LEDs in various color combinations and varying intensities.

In all examples set forth above, optionally, a sound card or chip may be located in the housing to produce a sound effect when the candle is illuminated to provide a more realistic effect when the power is turned on. In addition, the housing may contain a receiver and microprocessor to permit operation by remote control, and/or a timer that switches the imitation candle "on" or "off" at a particular time. The candle may also include hardware and software necessary to allow the candle to be network enabled or to be able to communicate wirelessly (e.g., using a Wi-Fi, radio or Bluetooth connection), for example, to be controlled by a remote control or by application software on mobile device. Timers, sound sensors and/or light sensors may further be included to control or impact the operation of the imitation candle 100, 400 and 500.

It will be understood that various aspects or details of the invention may be changed without departing from the scope of the invention. The foregoing description of implementations has been presented for purposes of illustration and description. It is not exhaustive and does not limit the claimed inventions to the precise form disclosed. Modifications and variations are possible in light of the above description or may be acquired from practicing the invention. For example, while an electronic candle has been primarily disclosed, aspects of the present invention could be applied to other luminary devices, such as wall sconces, lanterns, paper candles, or tiki torches, without departing from the scope of the invention. The claims and their equivalents define the scope of the invention.

What is claimed is:
1. An imitation candle comprising:
(a) a housing that simulates a candle body, where the housing has a top surface, base, and side walls, where the side walls are translucent;
(b) a flame element positioned above the top surface of the housing, where the flame element includes a faux flame element that produces a flickering lighting effect, wherein the flickering light effect projects light onto the faux flame element;
(c) a light source located near the base of the housing to illuminate the translucent side walls of the candle body such that the light emitting from the light source is visible through the side walls of the candle body when viewed from outside the housing.

2. The imitation candle of claim 1 wherein the flickering lighting effect is provided by a second light located near the base of the candle body within the housing and a light transmitting device running between the second light source and the flame element that transmits a flickering light from the second light source to the flame element.

3. The imitation candle of claim 1 wherein the flickering lighting effect is provided by a second light source located near the top surface of the housing reflecting off the faux flame element.

4. The imitation candle of claim 1 wherein the light source located near the base of the housing provides a color changing lighting effect capable of illuminating the candle body in different colors.

5. The imitation candle of claim 1 wherein the faux flame element is suspended from the top surface of the housing allowing the faux flame element to swing freely relative to the housing.

6. The imitation candle of claim 4 wherein the faux flame element is attached to one end of a pendulum and where a counter weight element is attached to an opposing end of the pendulum opposite the faux flame element, and where the pendulum is pivotally connected to the housing to allow the faux flame element to swing freely relative to the housing.

7. An imitation candle comprising:
(a) a housing that simulates a candle body, where the housing has a top surface, base, and side walls, where the side walls are translucent;
(b) a flame element positioned above the top surface of the housing, where the flame element produces a flickering lighting effect, wherein the flickering lighting effect is provided by a first light source located near the base of the candle body within the housing and a light transmitting device running between the first light source and the flame element that transmits a flickering light from the first light source to the flame element;
(c) a second light source located near the base of the housing to illuminate the translucent side walls of the candle body such that the light emitting from the second light source is visible through the side walls of the candle body when viewed from outside the housing.

8. An imitation candle comprising:
(a) a housing that simulates a candle body, where the housing has a top surface, base, and side walls, where the side walls are translucent;
(b) a flame element positioned above the top surface of the housing, where the flame element produces a flickering lighting effect, wherein the flame element includes a faux flame element having light reflected thereon, where the faux flame element is suspended from the top surface of the housing allowing the faux flame element to swing freely relative to the housing;
(c) a light source located near the base of the housing to illuminate the translucent side walls of the candle body such that the light emitting from the light source is visible through the side walls of the candle body when viewed from outside the housing.

9. An imitation candle comprising:
(a) a housing that simulates a candle body, where the housing has a top surface, base, and side walls, where the side walls are translucent;
(b) a flame element positioned above the top surface of the housing, where the flame element produces a flickering lighting effect, wherein the flame element includes a faux flame element having light reflected thereon, where the faux flame element is attached to one end of a pendulum and where a counter weight element is attached to an opposing end of the pendulum opposite the faux flame element, and where the pendulum is pivotally connected to the housing to allow the faux flame element to swing freely relative to the housing;
(c) a light source located near the base of the housing to illuminate the translucent side walls of the candle body such that the light emitting from the light source is visible through the side walls of the candle body when viewed from outside the housing.

* * * * *